United States Patent [19]

Bürkner

[11] 4,377,230

[45] Mar. 22, 1983

[54] PROCESS AND A DEVICE FOR THE DISTRIBUTION OF A CONVEYED FLOW

[75] Inventor: Wolfgang Bürkner, Darmstadt, Fed. Rep. of Germany

[73] Assignee: Carl Schenck AG., Fed. Rep. of Germany

[21] Appl. No.: 190,506

[22] Filed: Sep. 25, 1980

[30] Foreign Application Priority Data

Oct. 18, 1979 [DE] Fed. Rep. of Germany ....... 2942163

[51] Int. Cl.[3] ....................... B65G 11/20; B65G 47/44

[52] U.S. Cl. ...................................... 198/525; 193/14; 193/29; 198/569; 239/498; 239/504; 239/518; 239/552; 239/650

[58] Field of Search ....................... 198/525, 535, 569; 193/3, 14, 23, 27, 28, 29; 222/547, 564, 270, 328; 239/498, 504, 513, 518, 521, 552, 565, 650

[56] References Cited

U.S. PATENT DOCUMENTS 3,191,752 6/1965 Biehn ............................... 193/14 X 3,409,187 11/1968 Socha ............................... 193/29 X 4,057,136 11/1977 La Porte, Jr. ................. 239/650 X

*Primary Examiner*—Jeffrey V. Nase

*Attorney, Agent, or Firm*—Connolly and Hutz

[57] ABSTRACT

This invention relates to a process and a device for the distribution of a conveyed flow, such as particles for the preparation of chipboard, fiberboard, or the like, by means of a separation of the conveyed flow into two partial flows. The distribution is continuous and uniform and provided, for example, by a distributing device which may have a variable insertion into the flow stream. The distributing device may have a separating plate with an active edge having regularly-spaced tongues and slots. A dividing plate having chutes of variable width extending through it can be used to vary the ratio of particles separated in the two directions. Baffled rollers may be used to ultimately guide the separated streams. The separation may also be accomplished by chambered rollers rotating in opposite directions.

4 Claims, 8 Drawing Figures

PROCESS AND A DEVICE FOR THE DISTRIBUTION OF A CONVEYED FLOW

BACKGROUND OF THE INVENTION

German Pat. No. 11 08 414 describes a distributing device for a bulk goods flow formed particularly of glued wood chips of the same or different kinds for the manufacture of chip members. The flow falls onto a distributing flap which produces partial bulk goods flows which are conducted further into respective shunts. The device is distinguished by the combination of a mechanical driving device which imparts to the flap, or the like, a continuous pendular movement having preset swings in conjunction with a device which can automatically change the range of the pendular movement with respect to a somewhat horizontal axis of the flow of goods. Such a distributing device has the drawback that with a continuous feed of the conveying flow, the distribution into two conveying flows takes place discontinuously, something which necessarily leads to irregularities when these separated flows are further processed to chipboard if these partial flows are deposited onto a conveyor belt as flock by projection and wind scattering. Such a distributing device has a further drawback that when feeding the conveying flow to be separated, the necessarily occurring separation is conveyed further, not uniformly divided into the two partial flows, but rather one partial flow contains coarser conveyed goods, while the other contains finer conveyed goods. In addition, such a distributing device is extremely sensitive to the conveyed goods to be distributed in such a way that the rotational axis of the distributing device must be parallel to the bulk goods flow and must be arranged in the center thereof, since in the formation of an angle between axis and distributing device and the bulk goods flow, an additional faulty distribution takes place which is superimposed on the separation effect previously mentioned above. Because of these drawbacks, it has been impossible so far to produce an exact separation of the conveyed flow into two equal conveyed flows as required for the preparation of chipboard of high quality.

According to German Pat. No. 12 30 203, the sensitivity of the distributing device is equalized by the arrangement of spray chutes in such a manner that the spray chutes per se are pendularly movable at right angles to the longitudinal direction of the stream, yet, despite a continuous supply, a constant withdrawal is impossible over the entire breadth of the conveying goods flow. Due to the relatively low oscillating frequency of the spray goods, chutes, their accurate insertion within a spray head is impossible, since a measure of comparison of the goods delivered through the spray chutes up to the discharge point can no longer be carried out. Such incomparable dumped quantities of chips produce a chip flock which does not fulfill specified requirements with respect to uniform density and thickness.

SUMMARY

Emanating from this state of the art, the object of the invention is to effect a constant distribution of a total conveyed flow into two partial flows without changing the composition of the particles to be conveyed existing in the original conveyed flow. Emanating from the prior art, the object is solved in that the conveyed flow is continuously fed to a flow divider and that a plurality of continuous and uniform partial flows are conducted along the flow divider and a plurality are continuously and uniformly conducted through the flow divider. By means of the distribution carried out without interruption of the conveyed flow, the existing composition of the particles, across the cross section of the entire conveyed current, is retained after the separation.

The object, fundamental to the invention, may also be solved, emanating from the prior art, in that the conveyed current is continuously supplied to a flow divider, in that a plurality of partial flows are continuously and uniformly removed along the flow divider and a plurality are continuously and uniformly removed at an angle to the first partial flow. With a continuous and uniform conveyed flow of current, continuously and uniform distribution is achieved thereby also without disturbing the composition and the grouping of the individual particles.

In a development of the invention, it is proposed that the conveyed flow direction and the flow divider take on an acute angle with respect to each other. By means of this novel direction, an uncontrolled separation is clearly avoided.

In a further development of the invention, it is proposed that the entire conveyed flow is directionally fed to the separator. By means of a directional supply, an assurance is given that no stray partial flows pass by the novel separator into stray partial flows.

In yet a further development of the inventive subject matter, it is proposed that the separated partial flows are equalized, each by itself, over their breadth. Particularly by means of the equalization over the breadth of the separated partial flows, which initially are represented as a plurality of stream-like individual flows during the separation, the streams are clearly dissolved and there takes place a partial flow, uniform when viewed over its breadth, which subsequently may either be conducted further directly for the preparation of a chip flock, be it by wind or projection scattering, or which may be supplied to a gluing device, for example.

In order to carry out the process, a device with a bin and a discharge device connected thereto is employed, which is characterized in that a rake-shaped distributing device is provided below the discharge device and that the conveyed flow removed from the discharge device penetrates only the slotted range of the rake-shaped device. By means of this device, it is achieved that no secondary flows set in which influence the uniform separation and that particularly the entire original conveying flow is clearly distributed. Another novel solution of the process is made possible by a device which is characterized in that the rake-shaped distributing device is a plate, adjustable in its position, through which chutes project at a specifiable angle to the plate and that the conveyed flow is conducted along the plate. By conducting the conveyed flow along the plate, a well-defined guidance and a continuous uniform separation is equally achieved by means of the chutes protruding from the novel plate for the object solved by another process.

In a development of the device, it is proposed that the slotted breadth of the rake-shaped separating device be variable. This variable chute breadth in the development of the subject matter of the invention provides the possibility of eliminating the influence of the chutes, serving as resistances, on a uniform distribution into two equal partial flows even at higher velocities of the supplied flow. Furthermore, the variable chute breadth is applied then when the separation ratio, in maintaining the same particle composition, deviates from a given ratio of 1:1.

In still a further development of the subject matter of the invention, it is proposed that the dovetails be adjustable in their spacing relative to each other. The adjustability of the dovetails relative to each other with a fixed dovetail breadth serves equally for the separation of a conveyed flow, wherein the separation ratio should become disproportionate to 1:1 yet the composition of the particles must be maintained. The slightest breadth, which must exist between the dovetails, may not be smaller than the maximum chip dimension of the conveying flow to be separated.

In still a further development of the device, it is proposed that connected to the rake-shaped separating device there be arranged, depending on direction, a plurality of parallel baffle rollers, rotating in the same direction. By utilizing an arrangement of parallel baffle rollers, rotating in the same direction, for each partial flow, a drawing together of the strands in individual flows over the entire breadth of the baffle roller is achieved.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

Figure 2:
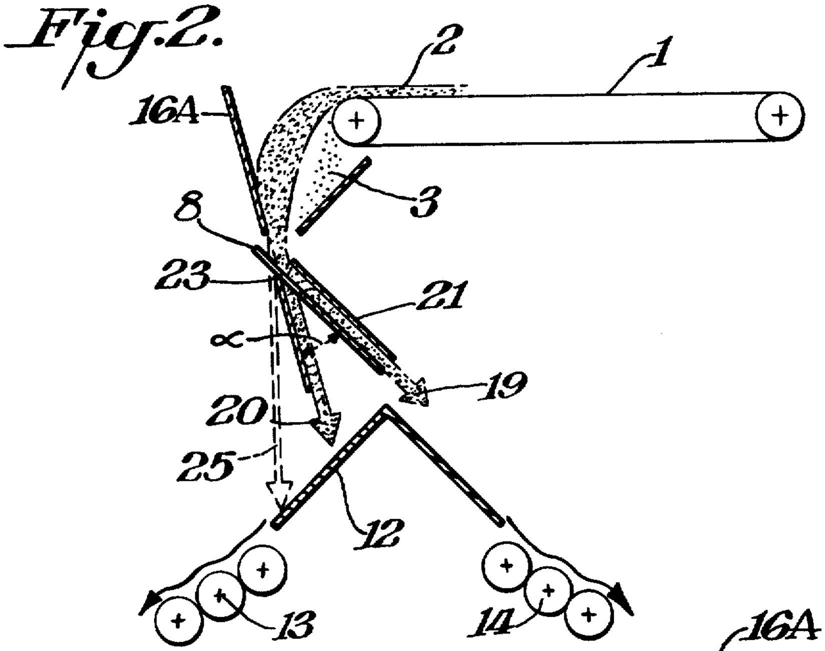
FIG. 2 is a schematic diagram in cross-sectional end elevation of a variable-flow embodiment of this invention with principal flow shown in solid outline and part of flow corresponding to FIG. 2*b* in phantom outline.
Figure 3:
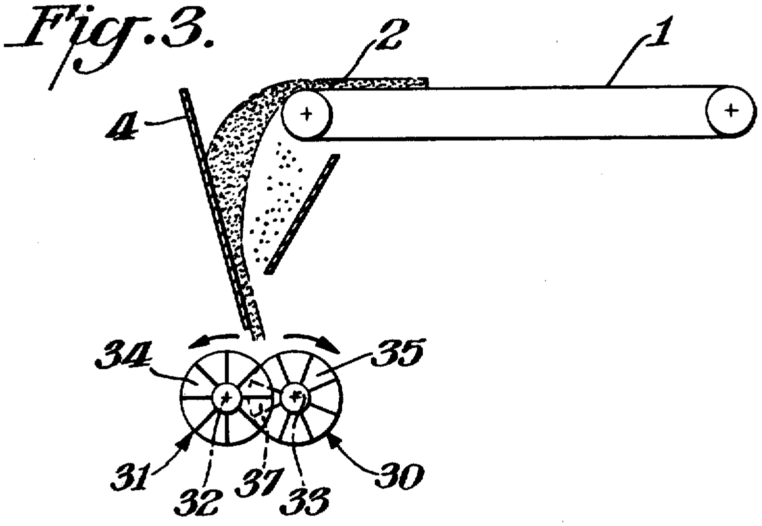
Figure 3A:
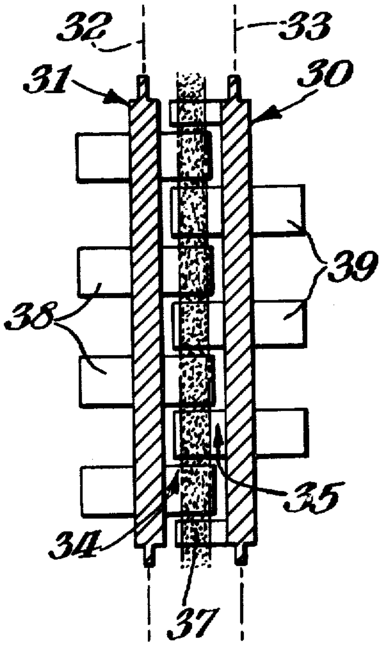

2*b* is an enlarged side elevational view of the distributing portion shown in FIG. 2 having chutes narrowed;

FIG. 3 is a schematic diagram in cross-sectional end elevation of still a further embodiment of this invention; and FIG. 3*a* is a schematic top plan view partially in cross-section of the chambered roller distributing portion of the embodiment shown in FIG. 3.

DESCRIPTION OF THE PREFERRED EMBODIMENTS

Figure 1:
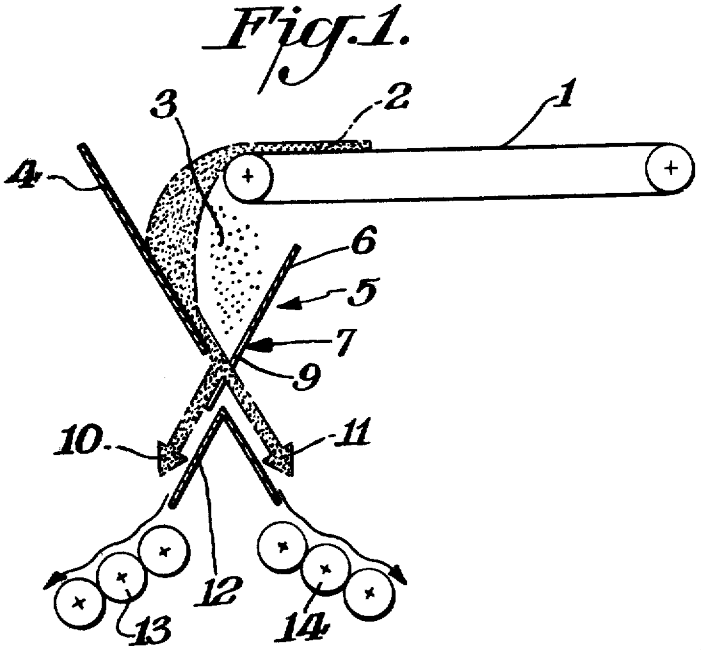
FIG. 1 is a schematic diagram in cross-sectional end elevation of one embodiment of the invention.
Figure 1A:
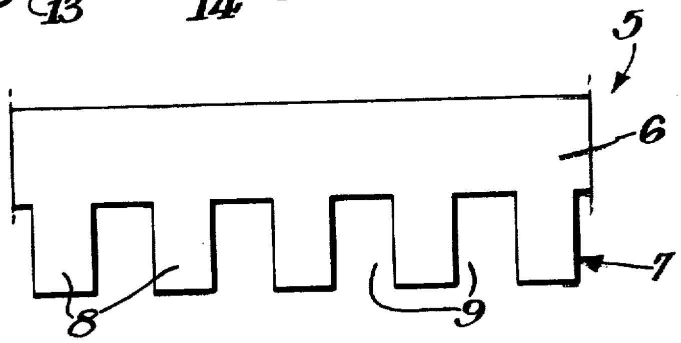
FIG. 1*a* is a side elevational view of a portion of a distributing element shown in FIG. 1.

According to FIG. 1, a conveyed flow 2 is discharged from a storage bin by way of a discharge bottom belt 1, the flow being conducted to a distributing device 5 by means of a baffle plate 4. This distributing device comprises a further baffle plate 6, which conducts for distribution particles 3 which were not included in the conveying current 2 because of adhesion to the discharge belt 1, and a rake or comb 7, which, as shown in FIG. 1*a*, comprising tongues 8 and slots 9. For the separation of conveyed flow 2 and of partial flow 3, there are provided tongues 8 and slots 9 in rake or comb 7. Along tongue 8, partial flows 10 are directed toward the left, while partial flows 11 are conducted to the right through slots 9.

Figure 1B:
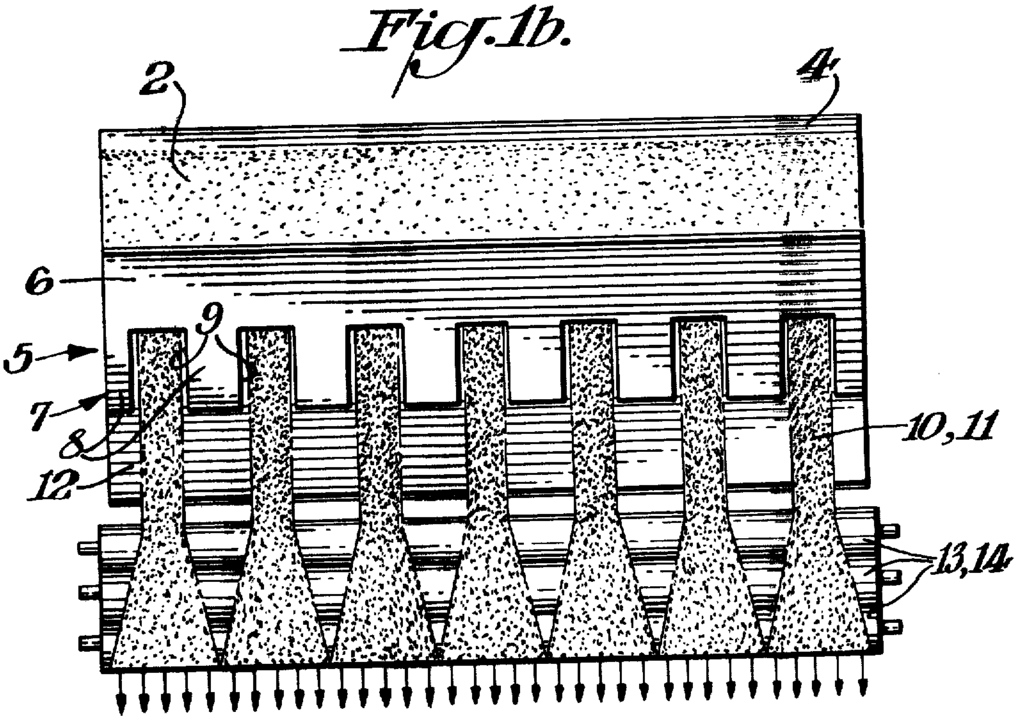
FIG. 1*b* is a schematic right side elevational view showing the distributing element and in conveyed flow as shown in FIG. 1.

It has been shown to be particularly advantageous if a guiding device 12 is arranged between partial flows 10 and 11 in order to prevent the continuously divided partial flows 10 and 11 from intermingling and to make certain that the continuously divided partial flows reach baffle rollers 13, 14, which in a preferred manner as shown in FIG. 1*b* distributes the always streamlike partial flows 10 or 11 over an eventually combined spread. In FIG. 1*b* for the sake of clarity, the streamflows 10 and 11 are shown of slightly reduced width within the area of slots 9. In actuality, the flows 10 and 11 would be of the same width as slots 9.

Another novel distributing device, illustrated in FIG. 2 is explained in greater detail below. The elements corresponding to those in FIG. 1 are designated with the same numerals. The conveyed flow 2 and partial flow 3, discharged by way of discharge belt 1, are conducted to a plate 16A from which chutes 21 project at an adjustable angle $\alpha$. Conveyed flow 2 and partial flow 3, conducted along plate 16A, are at first jointly conducted along on the surface of the plate 16A and up to the fork created between plate 16A and chutes 21. Beginning with the distribution, there are then continuously conducted first partial flows 19 along chutes 21 by means of guiding chutes 21 to the baffle roller 14, while second partial flows 20 are supplied to the baffle rollers 13 along plate 16A. In such a preferred design according to the invention, chutes 21 are used to maintain the once established continuous separation. For this purpose, it is viewed as a specially effective embodiment if the guiding devices 21 protrude over vertex 23 into the upper portion of plate 16A.

Figure 2A:
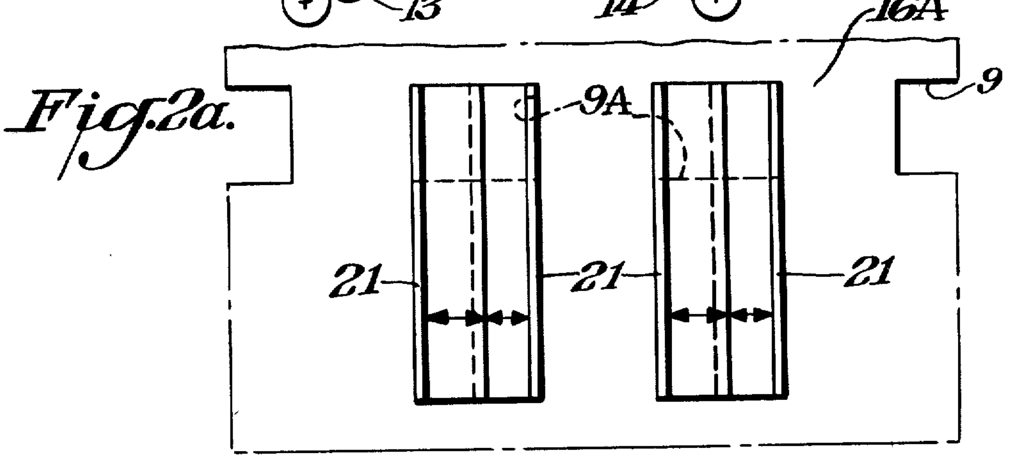
FIG. 2*a* is an enlarged side elevational view of distributing portion shown in FIG. 2 having fully open chutes.

Illustrated in FIG. 2*a* in a simplified manner is the adjustability of chutes 21, said guiding (devices protruding beyond vertex 23A of angle $\alpha$ into the upper portion of plate 16A). When chutes 21 are open the full width of slots 9A, each can have its breadth changed in the simplest manner and thus a continuous distributing of the conveying flow can be effected while maintaining the composition of the conveyed flow. FIG. 2*a* to that extent represents in the simplest manner the continuous distribution of the conveyed flow made possible by the invention if the composition of the conveyed flows is not to be altered by the continuous distribution and to this extent is not limited to the claimed distribution process of 1:1 for the conveyed flows for the chipboard.

Figure 2B:
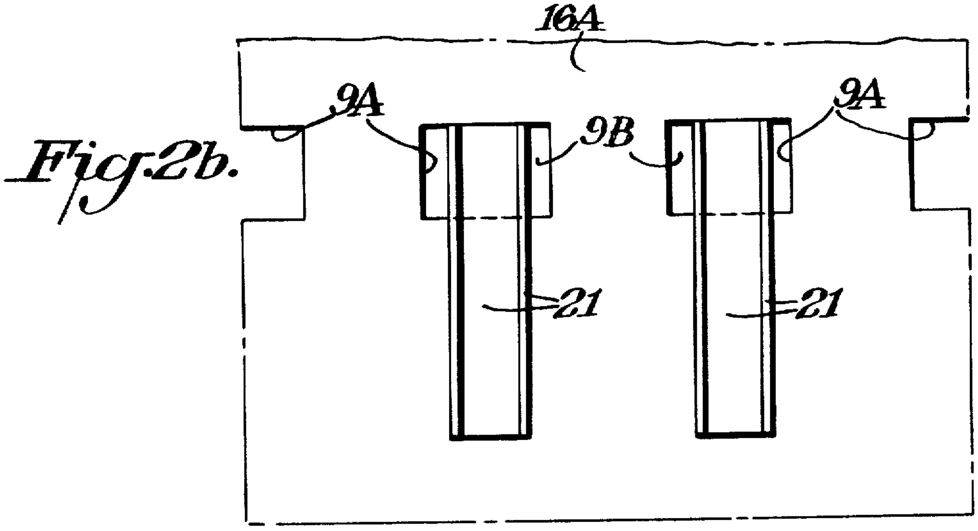

FIG. 2*b* shows narrowed chutes 21 having opened spaces 9B of slot 9A on either side of the chutes 21. This causes portions of stream 20 particles to flow straight down through slot 9 on the other side of plate 16A as stream 25. The ratio of division of particles must, therefore, take stream 25 into account.

If, in place of the flow distributors illustrated in FIGS. 1 to 2*a*, chambered rollers 30, 31 are employed, as shown in FIG. 3, a quasi continuous distribution of the conveyed flow into two partial flows can equally be effected, and in particular while maintaining the composition of the original conveyed flow. Such a simple solution is then applied when an absolute stability for the further conveyance is not disturbed caused by the speed of the chambered rollers 30, 31, and if a fixed ratio in the distribution, e.g. 1:1, can be viewed as sufficient while maintaining the composition of the original flow. Conveyed flow 2, conducted to the baffle plate 4 from discharge belt 1, is conducted to the chambers between the rotational axes 32, 33 of the chambered rollers 30, 31. Chamber rollers 30, 31 rotate, as shown in FIG. 3, in opposite directions and distribute the conveyed goods, falling into the particular chambers 34, 35, toward the left and toward the right by means of a non-illustrated guiding device on similarly non-illustrated baffle rollers 13 and 14 as shown in FIGS. 1 and 2. In such a manner, a streamlike partial conveying flow is equally converted, by means of the novel chambered rollers in combination with the baffle rollers, into a uniform partial conveying flow as viewed over its breadth.

In FIG. 3*a*, two individual chambered rollers 30, 31, are shown in top view, a plurality of such chambers being arranged on axes 32, 33 over the entire breadth of the conveying flow. The conveyed flow to be separated, guided by the baffle plate 4, falls into chambers 34 or 35 of the chambered rollers in an area 37, marked by dashes, and is separated as already described in connection with FIG. 3 and indeed while maintaining the composition of the original conveyed flow. At a respective speed, a negligible error in uniformity is caused by the chamber walls 38, 39, which as a result of the speed of the chambered rollers 30, 31, rotate at a certain frequency. The object fundamental to the invention is similarly solved thereby.

I claim:

1. An apparatus for the distribution of a conveyed flow of particles for the production of chipboard, fiberboard or the like by separation of the conveyed flow into two partial flows comprising a feeding device for continuously supplying the conveyed flow of particles, a discharge device disposed below the feeding device for continuously receiving the conveyed flow of particles and continuously discharging such particles, a generally planar rake-shaped distributing device disposed below the discharge device for continuously distributing the flow of conveyed particles received from the discharge device in two different directions, the rake-shaped distributing device comprising a plurality of spaced apart flat tongues with each adjacent pair of tongues separated by a slotted portion, the discharge device and rake-shaped distributing device being constructed and arranged to cause a portion of the conveyed flow of particles to penetrate only the slotted portions of the rake-shaped distributing device to thereby produce flow in one direction and to cause another portion of the conveyed flow of particles to flow along the flat tongues in a different direction.

2. An apparatus as set forth in claim 1, wherein variable chutes are provided at the slots for adjusting the width of the streams passing through the rake-shaped distributing device.

3. An apparatus as set forth in claim 2, wherein the variable chutes are adjustable in their spacing relative to each other.

4. An apparatus as set forth in any one of claims 1, 2 or 3, wherein a plurality of substantially parallel baffle rollers rotating in the same direction are connected below the rake-shaped distributing device.

* * * * *